United States Patent [19]

Scheckenbach et al.

[11] Patent Number: 5,750,221
[45] Date of Patent: May 12, 1998

[54] ABRASION-RESISTANT FLUOROPOLYMER MIXTURES

[75] Inventors: Helmut Scheckenbach, Langen; Andreas Schleicher, Einhausen; Jürgen Kulpe, Frankfurt am Main; Wolfgang Neumann, Kraiburg; Bernd Jansen, Emmerting, all of Germany

[73] Assignee: Hoechst AG, Frankfurt, Germany

[21] Appl. No.: 824,340

[22] Filed: Mar. 26, 1997

Related U.S. Application Data

[62] Division of Ser. No. 475,077, Jun. 7, 1995, abandoned, which is a division of Ser. No. 271,848, Jul. 7, 1994, abandoned.

[51] Int. Cl.⁶ ..................................... B29D 22/00
[52] U.S. Cl. .................. 428/35.7; 428/34.1; 428/373; 525/189
[58] Field of Search ........................ 428/373, 35.7, 428/34.1; 525/189

[56] References Cited

U.S. PATENT DOCUMENTS

| | | |
|---|---|---|
| 3,354,129 | 11/1967 | Edmonds, Jr. . |
| 3,948,865 | 4/1976 | Brady . |
| 4,362,069 | 12/1982 | Giatras et al. . |
| 4,395,512 | 7/1983 | Kubota et al. . |
| 4,656,070 | 4/1987 | Nyberg . |
| 4,703,076 | 10/1987 | Mori . |
| 5,006,594 | 4/1991 | Rees . |
| 5,091,463 | 2/1992 | Onishi et al. . |
| 5,159,019 | 10/1992 | Yammamoto et al. . |
| 5,218,170 | 6/1993 | Ferlier et al. . |

FOREIGN PATENT DOCUMENTS

| | | |
|---|---|---|
| 0 199 991 | 5/1986 | European Pat. Off. . |
| 0 356 948 | 7/1990 | European Pat. Off. . |
| A 24 18 282 | 11/1974 | Germany . |
| A 58019397 | 2/1983 | Japan . |
| A 60038465 | 2/1985 | Japan . |

OTHER PUBLICATIONS

Derwent Publications, Ltd. AN 85-089682 & JP-A-60 038 465 (Summitomo Chem. KK).
European Search Report 94110401.0-Nov. 2, 1994.

*Primary Examiner*—Helen Lee
*Attorney, Agent, or Firm*—Connolly & Hutz

[57] ABSTRACT

An abrasion-resistant fluoropolymer mixture comprising
(A) from 75 to 99% by weight of a fluorocarbon polymer
(B) from 1 to 25% by weight of an oxidized polyarylene sulfide and, based on the sum (A)+(B),
(C) from 0 to 15% by weight of a filler,
is used for the production of feed pipes for Bowden cables which are pressure-resistant and abrasion-resistant.

17 Claims, No Drawings

ABRASION-RESISTANT FLUOROPOLYMER MIXTURES

CROSS REFERENCE TO RELATED APPLICATION

This application is a divisional application of application 08/475,077 filed Jun. 7, 1995 now abandoned, which is a divisional application of application of U.S. Ser. No. 08/271,848, filed Jul. 7, 1994, filed by the same inventor, now abandoned.

The invention relates to highly effective, abrasion-resistant polymer compositions based on fluorocarbon polymers having considerably improved long-term properties, in particular for antifriction tubes, for example feed pipes for Bowden cables. They are prepared from mixtures of fluoropolymers, for example polytetra-fluoroethylene (PTFE) and oxidized polyarylene sulfides.

Fluoropolymers have been known for some time. They are distinguished by high heat resistance and excellent chemicals resistance. In addition to the high toughness, both the thermoplastic and the non-thermoplastic fluoropolymers have a pronounced tendency to creep. In addition, the tribological properties of fluoropolymers are inadequate in many applications.

The literature describes additives, for example based on polyester compounds, which either improve the tendency to creep or the abrasion of fluoropolymers (JP-A 58/019397). However, they have the following disadvantages:

1. The polyester compounds decompose at the processing temperatures of the fluoropolymers,
2. the poor grindability of their mixture results in poor homogenization, and
3. the addition of the additives known hitherto considerably decreases the chemicals resistance of the fluoropolymers.

The latter also applies to aromatic polysulfones, as described in the literature (DE-A 24 18 282, JP-A-60/038465). In these cases, polymers are mentioned which are soluble in known organic solvents such as dimethylformamide or dichloromethane. Also known is a curable mixture of hydrogen peroxide-treated polyphenylene sulfide and a pigment; this mixture contains 13% of polytetrafluoroethylene (U.S. Pat. No. 3,948,865). It is used for crack-free coating of aluminum which coating can be cured in a short time. In this case, the polytetrafluoroethylene functions only as filler.

Also known are tubular products which comprise mixtures of polytetrafluoroethylene and a polyarylene sulfide and, if desired, fillers and which have excellent sliding and friction properties (U.S. Pat. No. 4,362,069). For paste extrusion and as a polymer additive, preference is given to PTFE polymers containing from about 5 to 25% by weight of linear or branched poly-p-phenylene sulfide. The disadvantages of these mixtures are the low chemicals resistance, the limited abrasion behavior and the poor heat resistance of the polyarylene sulfides employed.

The object was therefore to develop fluoropolymer-based compositions of particularly low abrasion which do not have the disadvantages described in the prior art or which have superior properties to those described.

The invention therefore relates to extruded tubular products which comprise a mixture of (A) from 75 to 99% by weight of a fluorocarbon polymer and (B) from 1 to 25% by weight of an oxidized polyarylene sulfide and, based on the sum (A)+(B), (C) from 0 to 15% by weight of a filler and which, owing to the particularly low abrasion, have a very long service life. Their use thus brings economic advantages with respect to saving of material employed and durability.

It was surprising that the addition of oxidized polyarylene sulfides, for example polyarylene sulfones and/or polyarylene sulfide copolymers containing any desired proportions of oxidized sulfide groups, for example S/SO/SO$_2$-arylene copolymers, to thermoplastic or non-thermoplastic fluoropolymers improves the tendency to creep and the abrasion while substantially retaining the chemicals resistance and heat resistance. Furthermore, polymer mixtures of this type are distinguished by very good mechanical properties in the tensile test. These mixtures are particularly suitable for applications in the form of extruded tubes, as used for sheathing Bowden cables.

According to the invention, it is possible to use the following fluorothermoplastics containing recurring units of formula (I):

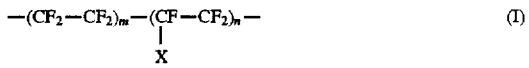

where X is O–R, where R is a perfluorinated alkyl radical having 1 to 8 carbon atoms, and m and n are each a number from 0.01 to 1, where the sum of m and n is 1.

The mixtures can furthermore contain fluorothermoplastics containing recurring units of the formulae (II)–(IV):

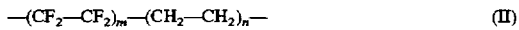

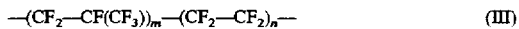

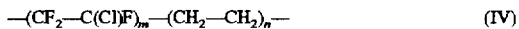

in which m and n are as defined above, and recurring units of the formulae (V) and (VI):

Also suitable for the mixtures according to the invention are non-thermoplastic fluoropolymers containing structural units of the following formulae:

It has proven advantageous to use polytetrafluoroethylenes in powder form which are suitable for paste extrusion.

Polymers which can be used for the mixtures according to the invention are linear and branched polyarylenes (Mw: 4000–200 000) whose recurring units contain at least one S and/or SO and/or SO$_2$ group as bridge and which have a heat resistance which is adequate for the fluoropolymers employed in each case, i.e. the two polymers in the mixture are stable under processing conditions. The polyarylenes have the formula (IX)

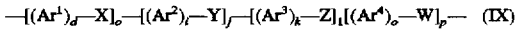

in which each Ar$^1$, Ar$^2$, Ar$^3$, Ar$^4$, W, X, Y and Z, independently of the others, is identical to or different from the others. The indices d, e, i, j, k, l, o and p are, independently of one another, zero or integers 1, 2, 3 or 4, where their sum must be at least 2. Ar$^1$, Ar$^2$, Ar$^3$ and Ar$^4$ in the formula (IX) are simple or directly para-, meta- or ortho-linked arylene systems having 6 to 18 carbon atoms. W, X, Y and Z are linking groups selected from —SO$_2$—, —S—, —SO—, —CO—, —CO$_2$—, alkylene or alkylidene groups, each having 1–6 carbon atoms, and —NR[1]— groups where R[1] is an alkyl or alkylidene group having 1–6 carbon atoms. Excluded from this group are polymers from the class consisting of the polyether sulfones.

Particularly suitable polymers are polyarylenes containing recurring units of the formula (X):

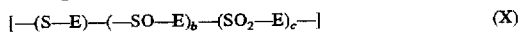
$$[—(S—E)_a—(—SO—E)_b—(SO_2—E)_c—]$$ (X)

in which each E, independently of the others, is phenylene, naphthylene or biphenylene, b and c, independently of one another, have values of from 0 to 1 and a has values of from 0 to less than 1, with the proviso that the sum a+b+c is equal to 1 and at least two of the indices are greater than zero and if any sulfur links (—S—) are present, at least further —SO— and —SO$_2$— links are also present.

Polymers which can be specifically employed are those containing recurring units of formulae (XI)–(XIII)

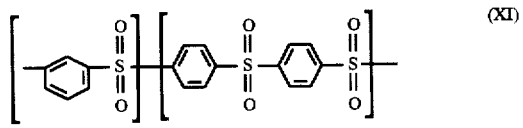 (XI)

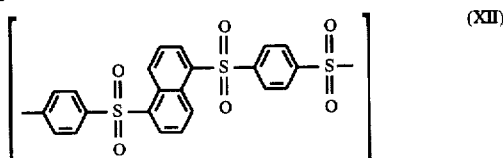 (XII)

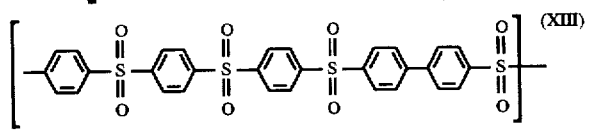 (XIII)

and oxidized polyphenylene sulfides containing recurring units of the formula (XIV)

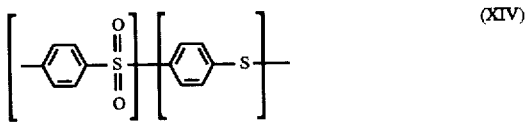 (XIV)

where the sulfone content is at least 65%.

The oxidized polyarylene sulfides are prepared by the processes described in (as yet unpublished) German patent applications P 43 14 737.2 which corresponds to U.S. Ser. No. 08/237,271, now U.S. Pat. No. 5,496,917 and P 43 14 738.0 which corresponds to U.S. Ser. No. 08/237,272 now U.S. Pat. No. 5,496,916 of 4 May 1993, which are expressly incorporated herein by way of reference.

The particle size of the oxidized polyarylene sulfides according to the invention is generally from $3·10^{-6}$ to $300·10^{-6}$ m, preferably from $5·10^{-6}$ to $100·10^{-6}$ m, in particular from $5·10^{-6}$ to $50·10^{-6}$ m.

The proportion of polyarylene sulfones or S/SO/SO$_2$-arylene copolymers is, according to the invention, 1 to 25% by weight, preferably from 1.5 to 20% by weight, in particular from 2 to 15% by weight. The proportion of fluoropolymers in the mixtures according to the invention is from 75 to 99% by weight, preferably from 80 to 98.5% by weight, in particular from 85 to 98% by weight, where the proportions of the two polymers, based on the entire polymer mixture, add up to 100%. The mixtures according to the invention can contain one or more fluoropolymers and one or more polyarylene sulfones and/or S/SO/SO$_2$-arylene copolymers and modified fluoropolymers, modified polyarylene sulfones or modified S/SO/SO$_2$-arylene copolymers.

According to the invention, the mixtures can additionally contain up to 15% by weight, based on the total amount of polymer mixture, of fillers. These comprise glass, for example glass microbeads, metal or mineral products, which can be in various forms.

In the preparation of the molded products, the mixture according to the invention is prepared by two methods. In the first method (a), a fluoropolymer in powder form is mixed with all of the oxidized polyarylene sulfide to be employed in a mixer in which the particles must not be subjected to any shear forces, for example in a tumble mixer. After adequate premixing, a lubricant, for example a hydrocarbon mixture such as Shellsol 100–140 (producer Shell AG, Hamburg, Germany), is added, and the mixture is treated further until homogeneous.

In a further method (b), the oxidized polyarylene sulfide is added to a dispersion of the fluoropolymer. By subsequent extraction by stirring, the two polymers are deposited as a mixture. The deposited polymer mixture is then mixed with a lubricant as in method (a).

The resultant mixtures of components (A), (B) and, if used, (C) are precompacted (compaction ratio 1:3) and subsequently molded by paste extrusion to give a cylindrical hollow shape or a tube. This preform produced in this way is then subjected to two-step thermal treatment. In the first step, the lubricant is removed at from 100° to 350° C., and the molding which remains is subsequently sintered at temperatures of from 260° to 470° C. for from 10 seconds to 20 minutes. If desired, this can be followed by thermal aftertreatment at from 260° to 470° C. for from 5 minutes to 24 hours.

EXAMPLES

1) Mixture A'

A dry mix comprising 93 parts by weight PTFE (®Hostaflon TF 2071, Hoechst AG, Frankfurt/Main, Germany) and 7 parts by weight of polyphenylene sulfone (prepared as described in the German patent application 43 14 738.0) was prepared. As lubricant, 20 parts by weight of Shellsol 100–140 were added per 100 parts by weight of PTFE.

2) Mixture B' (comparative example)

93 parts by weight of PTFE (as in mixture A') and 7 parts by weight polyphenylene sulfide. Lubricant addition as for mixture A'.

Mixtures A' and B' containing the lubricant were converted into tubes in an extruder, type WP 80/1000, year of construction 1991 (Worek, Adelsdorf-Neuhaus, Germany).

| Machine and processing data: | |
|---|---|
| Barrel: | 63.5 mm internal diameter |
| Mandrel: | 19.0 mm external diameter |
| Extrusion die: | 7.0 mm internal diameter |
| Extrusion mandrel: | 4.0 mm external diameter |
| Reduction ratio (RR): | 111 |
| Die temperature: | 30° C. |
| Barrel temperature: | 30° C. |
| Drying zone temperature: | 290° C. |
| Sintering zone temperature: | 450° C. |
| Extrusion rate: | 0.7 m/min |
| Extrusion pressure mixture A': | 135 bar |
| Extrusion pressure mixture B': | 125 bar |
| The extruded tubes had the following final dimensions: | |
| Internal diameter: | 3.2 mm |
| External diameter: | 6.5 mm |
| Shrinkage of external diameter: | 7.1% |

The abrasion of the tubes made from mixture A' and mixture B' was subsequently determined by the "Bowden cable method":

In this, a tube was shaped into a quarter circle (tube radius 120 mm) in each of 2 devices. Of these 2 devices, one is in a drying cabinet (experiments at elevated temperatures, here: 150° C.) and the other is in a normal environment (experiments at RT). A steel cable weighted at each of its ends with a mass of 60 kg runs in the tubes in both devices. This steel cable (diameter 3 mm, 19 strands of 0.6 mm each) is moved alternately in both directions by 40 mm in each case (stroke length) by means of a cylinder (frequency: 60 strokes/min), so that friction contact occurs between the tube and the steel cable. The weight loss of the tubes after a certain number of strokes is measured, both at room temperature and at the set heating cabinet temperature (150° C.).

|  | Abrasion [%] after 0.5 million strokes | | Abrasion [%] after 1.0 million strokes | |
|---|---|---|---|---|
| Examples 1 and 2 | at RT | at 150° C. | at RT | at 150° C. |
| Tube made from mixture A' | 0.3 | 1.0 | 0.7 | 2.1 |
| Tube made from mixture B' (comparison) | 2.0* | 2.8* | — | — |

*Rubbed through after 30,000 strokes; abrasion determined after 30,000 strokes.

3) In addition, tubes of smaller diameter than above were extruded from mixtures A' and B' and further mechanical properties were determined thereon. These tubes were produced on a Davis electric cable extruder (Davis electric type: 0-001-796, Wallingford, Conn., USA).

| Machine and processing data: | |
|---|---|
| Barrel: | 50.8 mm internal diameter |
| Mandrel: | 12.7 mm external diameter |
| Extrusion die: | 3.35 mm internal diameter |
| Extrusion mandrel: | 2.45 mm external diameter |
| Reduction ratio (RR): | 463 |
| Die temperature: | 50° C. |
| Barrel temperature: | 40° C. |
| Drying zone temperature: | 150° C. |
| Sintering zone temperature: | 400° C. |
| Extrusion rate: | 4 m/min |
| Extrusion pressure mixture A': | 530 bar |
| Extrusion pressure mixture B': | 380 bar |
| The extruded tubes had the following final dimensions: | |
| Internal diameter: | 2.0 mm |
| External diameter: | 2.9 mm |
| Shrinkage of external diameter: | 13.4% |

Tensile tests were carried out on the two tubes:

|  | Tear strength [%] | | Elongation at break [%] | |
|---|---|---|---|---|
| Examples 3 and 4 | at RT | at 200° C. | at RT | at 200° C. |
| Tube made from mixture A' | 94 | 28 | 440 | 210 |
| Tube made from mixture B' (comparison) | 96 | 27 | 410 | 190 |

We claim:
1. An extruded tube produced from a mixture comprising
 (A) from 75 to 99% by weight of a fluorocarbon polymer,
 (B) from 1 to 25% by weight of an oxidized polyarylene sulfide which is a linear or branched polyarylene system having a molecular weight of from 4000 to 200,000 containing recurring units of the formula

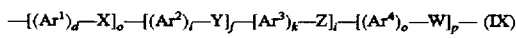

the indices n, m, i, j, k, l, o and p are identical or different and are integers from 0 to 4, where their sum must be at least 2, $Ar^1$, $Ar^2$, $Ar^3$ and $Ar^4$, are identical or different and are simple or directly para-, meta- or ortho-linked arylene systems having 6 to 18 carbon atoms, and W, X, Y and Z are identical or different and are linking groups selected from —$SO_2$—, —S—, —SO—, —CO—, —$CO_2$—, alkyl or alkylidene groups having 1–6 carbon atoms, with the proviso that component (B) contains at least one SO or $SO_2$ group and polymers from the class consisting of polyether sulfones are excluded and,
 based on the sum (A)+(B),
 (C) from 0 to 15% by weight of a filler.

2. An extruded tube as claimed in claim 1, wherein the fluorocarbon polymer is polytetrafluoroethylene.

3. An extruded tube as claimed in claim 1, wherein the oxidized polyarylene sulfide is a polyarylene sulfone, a polyarylenesulfide/sulfoxide/sulfone copolymer, or a mixture thereof.

4. An extruded tube as claimed in claim 1, wherein constituent (B) is present in an amount from 1.5 to 20% by weight, and is a polyarylene sulfone, a polyarylenesulfide/sulfoxide/sulfone copolymer, or mixtures thereof.

5. An extruded tube as claimed in claim 1, wherein constituent (B) is a polyarylene containing recurring units of the formula

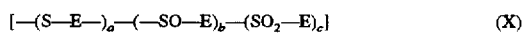

in which E, independently of the others, is phenylene, naphthylene or biphenylene, b and c, independently of one another, having values of from greater than 0 to 1, and a has values of from 0 to less than 1, with the proviso that the sum a+b+c is equal to 1, and if any sulfur links (—S—) are present, at least further SO and —$SO_2$— links are also present.

6. An extruded tube as claimed in claim 1, wherein constituent (B) is a polyphenylene sulfone containing recurring units of the formulae

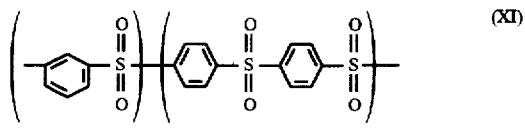

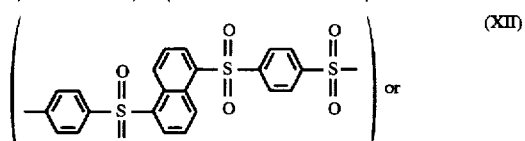

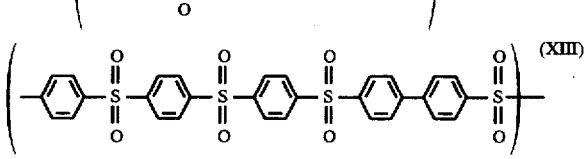

7. An extruded tube as claimed in claim 1, wherein constituent (B) is an oxidized polyphenylene sulfide of the formula

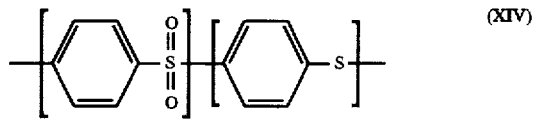

in which at least 65% of the sulfur atoms have been oxidized to sulfone groups.

8. An extruded tube as claimed in claim 1, wherein the particle size of the oxidized polyarylene sulfides is from $3 \cdot 10^{-6}$ m.

9. An extruded tube as claimed in claim 1, wherein the filler content is from 5 to 13% by weight.

10. An extruded tube as claimed in claim 1, comprising from 85 to 98% by weight of polytetrafluoroethylene and from 2 to 15% by weight of polyphenylene sulfone.

11. An extruded tube as claimed in claim 1, comprising from 85 to 98% by weight of polytetrafluoroethylene and from 2 to 15% by weight of polyphenylene sulfide/sulfoxide/sulfone copolymers.

12. An extruded tube as claimed in claim 2, wherein constituent (B) is present in an amount from 1.5 to 20% by weight, and is a polyarylene sulfone, a polyarylenesulfide/sulfoxide/sulfone copolymer, or mixtures thereof.

13. An extruded tube as claimed in claim 12, wherein constituent (B) is a polyarylene containing recurring units of the formula

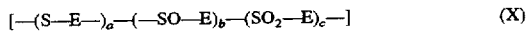

$$[-(S-E-)_a-(-SO-E)_b-(SO_2-E)_c-] \quad (X)$$

in which E, independently of the others, is phenylene, naphthylene or biphenylene, b and c, independently of one another, having values of from greater than 0 to 1, and a has values of from 0 to less than 1, with the proviso that the sum a+b+c is equal to 1, and if any sulfur links (—S—) are present, at least further —SO— and —SO$_2$— links are also present.

14. An extruded tube as claimed in claim 12, wherein constituent (B) is a polyphenylene sulfone containing recurring units of the formulae

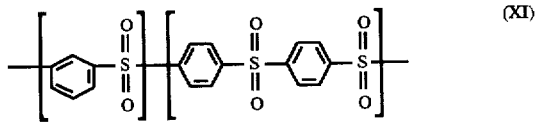

(XI)

15. An extruded tube as claimed in claim 12, wherein constituent (B) is an oxidized polyphenylene sulfide of the formula

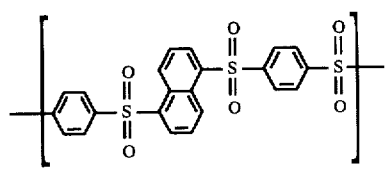

(XII)

or

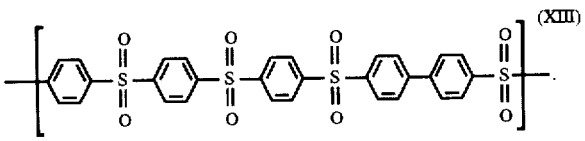

(XIII)

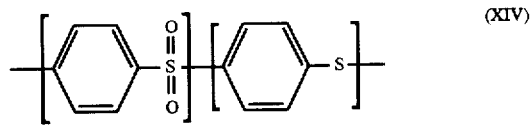

(XIV)

in which at least 65% of the sulfur atoms have been oxidized to sulfone groups.

16. An extruded tube as claimed in claim 12, wherein the filler content is from 5 to 13% by weight.

17. An extruded tube as claimed in claim 16, comprising from 85 to 98% by weight of polytetrafluoroethylene and from 2 to 15% by weight of polyphenylene sulfone.

* * * * *